Figure 2:
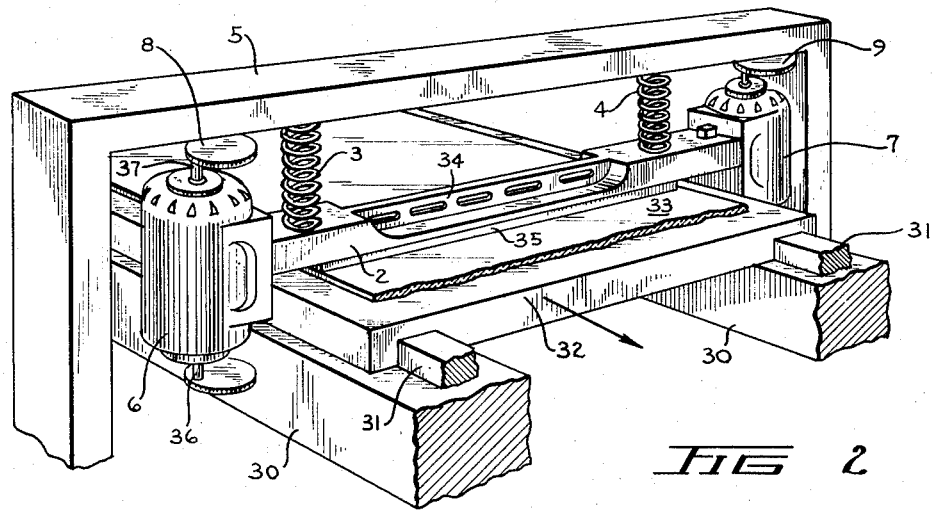

April 2, 1957 — I. PEYCHES — 2,787,100

PROCESS FOR SURFACING GLASS

Filed May 20, 1952

INVENTOR.
IVAN PEYCHES

BY

Dale A. Bauer
ATTORNEY

United States Patent Office 2,787,100
Patented Apr. 2, 1957

2,787,100

PROCESS FOR SURFACING GLASS

Ivan Peyches, Paris, France, assignor to Societe Anonyme des Manufactures des Glaces et Produits Chimiques de Saint-Gobain, Chauny & Cirey, Paris, France Application May 20, 1952, Serial No. 288,824

Claims priority, application France May 24, 1951

20 Claims. (Cl. 51—283)

This invention concerns the surfacing of glass, a term which includes both grinding and polishing. The invention is very useful in the continuous surfacing of glass, such as plate glass, and it will be described in connection with the polishing of sheets of glass, but it is to be understood that the particular description is for purposes of illustration and does not constitute a limitation on the generality of the invention.

This invention concerns the continuous process of glass surfacing, i. e. a process where the sheet glass moves at a slow pace along a straight path and is ground and polished by means of tools arranged one after the other along the path of the glass. These tools which exercise a certain pressure on the glass, are given a surfacing motion on the surface of the glass and they are supplied with grinding or polishing abrasive grains which are fed between the tools and the glass in order to rub the glass and surface it. The nature and size of the abrasive grains and the material of the rubbing surface of the tools vary according to the purpose which they are designed to effect.

It is an object of this invention to improve the surfacing of sheets of glass, particularly plate glass.

Another object is to produce apparatus capable of efficiently carrying out the new process.

These objects have been accomplished as set forth fully hereinafter.

In the known apparatus used to carry out the surfacing of glass sheets the motion imparted to the tools is such that the different points of said tools follow curved trajectories having a great curvature radius.

I have found that the grinding and polishing working is the more efficient as a same point of the glass surface has been submitted to a greater number of actions exerted in all directions.

In principle, the process of the invention is characterized in that the tool which surfaces the glass executes a periodic movement of translation along directrix closed curves and of small amplitude. The explanation given in what follows, relates to the case in which the said movement of translation follows a circular directrix; this movement, in which all the points of the tool describe circumferences of circles of equal radius, at equal velocity, and in the same directions, is designated hereinafter by the term homocircular movement.

In a preferred form of the invention, this homocircular motion is applied to the tools and the sheet of glass has a linear translation motion at a regular rate relatively to the tools.

In the process for the continuous surfacing of a glass sheet according to the invention, the surfacing action is exercised by at least one device having an active surface of which the dimension, in the direction of the displacement of the glass sheet, is constant from one lateral edge to the opposite edge of the sheet, the device being given a periodic translation movement of small amplitude comprised between about one millimeter to several centimeters along directrix closed curves, in particular circular curves.

The surfacing device may be constituted by a single rectangular element extending from one lateral edge of the glass sheet to the other. But it may also be formed of a plurality of elements juxtaposed or staggered one relatively to the other, for example disposed in quincunx, these elements being so arranged that their total area has in the direction of the displacement of the glass sheet, a dimension which is constant from one lateral edge to the other of the glass sheet.

One of the discoveries upon which this invention is based, concerns the life of the grains of abrasive material in the surfacing compositions. It has been shown that the life of a large grain of sand of the usual kind on the order of a half mm. in diameter, that is to say, the time during which it acts efficiently to perform its intended function under a surfacing tool, does not exceed about 20 revolutions of the grain, that is to say $\frac{1}{50}$ to $\frac{1}{100}$ of a second. It should be understood of course that the fragments of the grain may be used again, and may have a new life, in a more advanced phase of the work under a different tool. It is difficult to directly measure the life of those fine particles that have a diameter on the order of 20 mu, but it has been established that the small particles have a much longer life and will endure a higher number of rotations upon themselves under the corresponding tools, for instance several hundreds of rotations, even though the absolute duration of their lives does not represent more than about $10^{-3}$ to $10^{-4}$ second.

I have discovered, that to use an abrasive with full efficiency, because of the short life of the grain, it is necessary that the equatorial plane of the grain be rotated and turned in such a way that the grain shall have presented successively all its faces to the sheet of glass. This has been accomplished by the present invention.

The applicant has discovered, as a part of this invention, that the grains last longer and act better if they are subjected to the action of a surfacing tool having a periodic translation motion of an amplitude which is a function of the size of the grain. In general, the motion imparted to the grain by the tool will be circular, and in this case the radius of the circular motion imparted to the grain will be related to the grain as a function of its size. Thus, for the large grains with which the surfacing operation starts, and which are on the order of a ½ mm. in diameter, the optimum diameter of the homocircular movement of the tool should be between about 4 cm. and one cm., while, for the medium size grains of sand of the order of 50μ in size, the optimum diameter of the homocircular motion is between 10 and 5 mm.; for the finest surfacing composition containing grains of sand on the order of 10 to 20 mu, the diameter of the homocircular movement should be between about 5 and 2 mm.

The foregoing is particularly for the stage of the operation of surfacing that is technically called grinding. When we approach the part of surfacing which is called polishing, we are confronted with a different state of the glass and a different state of the materials employed. The polishing compositions do not act only by abrasion, but actually by subjecting the surface of the glass to plastic flowing; furthermore, the kind and the fineness of the abrasive are the same from the beginning to the end of the operation, the major difference being the quantity of liquid which is present with respect to the abrasive at different times of the polishing. Examinations under the microscope with phase contrast, have shown that between the depressions of the surface of the glass there is a mean distance which increases little by little in the course of polishing during the wet stage and considerably during the semi dry stage. Thus, in a polishing apparatus containing 24 successive tools, aligned along the path of the glass moving under them, the distance between the centers of depressions in the surface of the glass is on the order of ⅕ mm. at the eighth tool. To spread out these depressions by plastic flowing of the glass and to run them into one another in order to make them practically disappear, the polisher must have an amplitude of movement sufficient to bear on several crests at one time, for instance on 5 to 10. Therefore, the radius of homocircular movement imposed on the polisher should be on the order of a millimeter during the wet phase and a centimeter during the dry phase of polishing. Thus, the amplitude of the homocircular motion decreases as the grinding progresses and increases as the polishing progresses. During grinding, as the work is carried on with finer and finer grinding materials, the amplitude of the circular movement decreases. In polishing, the amplitude increases with the advance in the work although there is no change in particle size, under normal conditions.

It is one of the characteristics of the invention to employ homocircular motion of small amplitude of the tools upon the abrasive composition and the result is an improvement in the grinding and polishing of the glass, and an improvement in the uniformity of utilization of the abrasive grains and the efficiency of their action.

In accordance with another characteristic of the invention, the periodic movement along curves of small amplitude should be executed at high frequency in order to compensate for the short trajectory traversed during each period by the abrasive grains and because I have also ascertained that the efficiency of the surfacing operation is increased when the actions, to which the glass is, submitted in different directions, follow one another at smaller time intervals. In a general manner, according to the invention the frequency may be of an order comprised between about one hundred and several thousands revolutions per minute.

The frequency can be chosen to communicate to the grains of abrasive, linear velocities, with respect to the surface of glass, which are on the order of magnitude of the speeds attained in classic apparatus, while, because of their better efficiency in working as explained hereinabove, it is not necessary to attain linear velocities which are as high in order to obtain comparable quality. Thus, by imparting linear velocities equal to those of the prior art, a better polishing is accomplished, and by imparting linear velocities considerably lower, a result equal to that of the prior art is attained. Thus, it is possible to obtain a result as good as that produced by the prior art with linear speeds which are only ⅒ of those of the standard apparatus of the prior art, whereas the pressures need only be doubled. As applied to the large size particles, the speed of rotation most favorable is comprised between one hundred or several hundred turns per minute and it may attain for the finer particles several thousand turns per minute.

Figure 1:
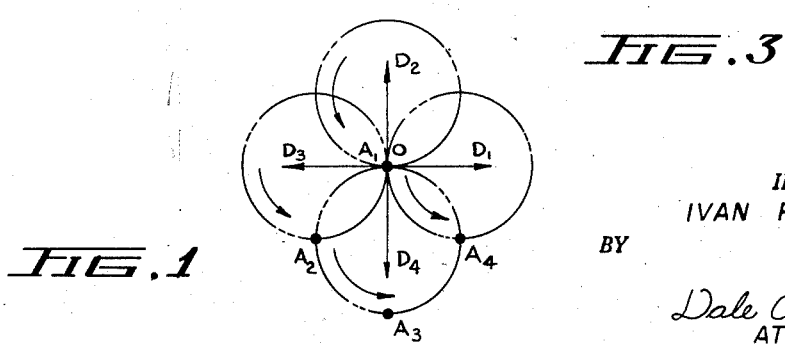

The process of the invention is indicated and apparatus embodying the invention is illustrated in the accompanying drawings: Fig. 1 is a diagram of homocircular motion as applied to a point.

Figure 3:
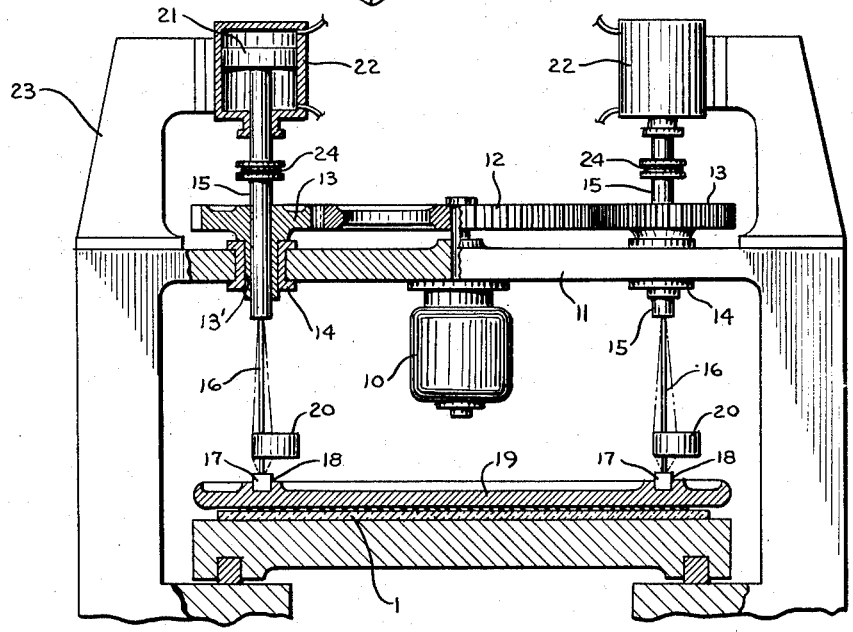

Fig. 2 is a perspective view of one type of apparatus embodying the principles of the invention. Fig. 3 is an elevational view properly in section of another type of apparatus involving the principles of the invention.

In Fig. 1 there is represented the effect of homocircular motion as applied to a point "O" on the surface of a sheet of glass. $A^1$, $A^2$, $A^3$ and $A^4$ are four distinct points on the surface of the tool, chosen so that their trajectories pass through the point "O" on the surface of the glass. The diameters of the trajectories of all points are identical. The point $A^1$ was selected to coincide with point "O," the point $A^2$ is one-quarter turn removed, the point $A^3$ is a half turn removed and the point $A^4$ is three-quarters turn removed from point "O." Thus, in a single revolution each of the four points will pass through the point "O." Every other point on the surface of the tool goes through an identical circle in a different place.

In polishing moving glass plates the point "O" will progress slightly between the arrival of the different points $A^1$ to $A^4$. The trajectory of each point of the tool will be transformed from a circle into a cycloid. When the point $A^1$ of the tool passes the point "O" it smooths the glass in the direction $D^1$ tangent to its trajectory, but when the point $A^2$ arrives at "O" it smooths the glass in the direction $D^2$; when the point $A^3$ arrives it smooths the glass in the direction $D^3$ and the point $A^4$ smooths it in the direction $D^4$. The tangent to the homocircles at the point "O" is thus being changed by 90° with each quarter turn.

It is to be understood that it is only for purposes of simplification that the matter has been explained in the terms of a single point on the glass and four points on the tool. In reality, during the length of time corresponding to a quarter revolution, there will be an infinity of trajectories described by other points of the tool which pass over the point "O," so that the glass is smoothed in an infinity of directions uniformly progressing from each other during a single revolution of the tool. According to a principle of the invention, this time is very short so that each point of the surface of the glass is subjected to perfectly symmetrical actions, and is repeatedly subjected to such actions, before the point has been materially displaced by the advance of the glass sheet. By this means, there is avoided the well known fault called "directional polishing" which results from working which has a preponderant effect in one direction, and which is manifested when anyone employs the tools of the prior art, which operate at a relatively low frequency on paths of great amplitude. Heretofore, in order to overcome this directional polishing, it has been necessary to have recourse to artifices such as variation in time of working, in the position of the tool, or when the tool is fixed, to stagger the successive tools relatively one to another in order to approach as closely as possible to the ideal of perfect working. None of these artifices are necessary with this invention.

All the characteristics of the invention unite the most favorable conditions not only as to the efficiency of using the abrasives, but in particular with respect to the uniformity of the effect upon the glass.

In everything which has gone hereinbefore, in order to facilitate the explanation, reference has been had only to homocircular movements of the tool, but it should be understood that it is within the dominion of the invention to employ any form of homocurvilinear motion, for example, motion in the form of various ellipses, and the principle can be carried, by elongation of the ellipses to the point of reducing the movement to a straight line vibration, but in the latter case it is necessary that the rectilinear line of action of the vibrating tool change constantly in direction so as to work isotropically upon the surface of the glass. In the case of ellipses and other non-circular homocurvilinear closed figures, the axis of the curve should change its direction constantly. Homocircular motion is preferred because it works perfectly and evenly upon the surface and because the construction of the machinery to carry it out does not involve the difficulties which attend the construction of machinery producing elliptical figures.

In constructing the apparatus of the invention, one may utilize any means which will produce in the tool a rapid, periodic motion of small amplitude, for example, a circular movement of translation can be obtained by giving to two points of the tool an identical circular rotational movement in synchronism. It is also possible to obtain this result by combining two straight line oscillatory movements perpendicular to each other of the same size but in quadrature. If on the contrary, these oscillatory movements are of amplitudes and periods that are variable, the resulting movements will be in the form of pseudo-ellipses, similar to the figures of Lissajou, of which the axes vary in dimensions and/or in direction, constantly and rapidly, and which are within the scope of the invention. These movements can be obtained, for example, by means of vibrations generated by electromagnets.

In Figs. 2 and 3 of the drawings are illustrated apparatus corresponding to the principles of the invention.

In Fig. 2 the numeral 30 indicates the frame of the machine, upon which are mounted tracks 31, over which moves a bed plate 32, which carries the sheet of glass which is to be worked. The bed plate 32 is moved slowly from the left to the right in the machine as shown in the drawing. A sheet of glass 33 is laid upon the bed plate of the machine and is subjected to the operation of the tool 2. A frame 5 extends over the glass transporting apparatus which has just been described. This frame 5 may be fixed in position or may be made movable as desired. During the operation of the machine it will be fixed when operated as shown in the drawings. The surfacing apparatus is composed of a beam 2 which is preferably composed of light material such as magnesium-aluminum alloy and is centrally shaped as a T beam 34 to reduce weight. On the bottom of this beam is the surfacing tool or facing 35 which may be constituted by a material depending upon the stage to which the work has progressed. The surfacing tool 35 according to the invention has an elongated rectangular active surface and extends over the whole width of the glass sheet in order to have the same action from one lateral edge of the sheet to the other. Because of the small amplitude of the periodic motion imparted to the tool, the dimension of the tool in the direction of the displacement of the glass sheet may be, for example, of the order of 20 to 50 times the amplitude of this periodic motion. Consequently a given point of the glass sheet will be submitted to a great number of actions exerted in all directions during its passage under the same tool i. e. during the same phase of the treatment. Means not shown, are provided for feeding abrasive composition to the surfacing tool 35, feeding being at the rate indicated above as being designed to most efficiently employ the grains of the composition. Two coil springs 3, 4 bear upon the bottom of the frame 5 and upon the top of the beam 2; except for these springs, the beam is free to move. On opposite ends of the beam 2 are motors 6, 7, which may be of any desired type, preferably electrical, and preferably synchronous motors. These motors have a shaft which extends out through the casing at each end as indicated at 36, 37 and on the ends of this projecting shaft are eccentric counter-weights or fly wheels 8 and 9. The fly wheels of the motor 7 and the fly wheels of the motor 6 are given the same orientation so that their vibratory effects will be combined and impart true homocircular motion of small amplitude to the beam 2. When the motors are energized, the eccentric weights revolve rapidly at the speeds of the motors and impart to the beam homocircular motion of small amplitude and high rate of revolution. The counterweights 8, 9 are preferably of the same weight, size and disposition. The motors are so constructed and coupled that the counterweights shall, at every instance, be oriented in the same direction and turn in synchronism and in phase. The amplitude of the movement will depend upon the total mass which is undergoing the movement.

The facing of the beam 35 may be of elastic material such as a layer of semi-hard rubber or of felt. The liquid used for polishing, which is generally a suspension of iron oxide in water, is introduced beneath the polisher through small fittings or passages leading to the under face.

The rectangular shape of the beam is particularly advantageous because, as the beam has very small displacement when it is operating, the successive beams can be brought so closely together as practically to cover the entire surface of the plate of glass being worked, which has never been possible with the usual circular tools operating with rotary motion, which of necessity leave areas between them which are uncovered. Because of this advantage, the invention markedly reduces the dimensions of the apparatus with respect to the area of surface which the apparatus works.

It is to be observed that because of the rectangular form of the surfacing tools and of the small amplitude of their movement, it is not necessary that they overlap the edges of the band of glass in order to obtain an equal polish on all the useful surface of the glass, as is necessary in the employment of circular tools. By utilizing tools having a length slightly inferior to the width of the plate of glass, surfacing takes place equally throughout substantially the whole width of the sheet with the exception of a very thin irregular part along the border which is of no use and is thrown away. The possibility of utilizing a tool which does not overlap the edge of the sheet of glass has the advantage of preventing the wearing away of the felt at the edge of the tool, which occurs when the ordinary tools, which do overlap, are employed.

It is to be understood that the tools can be aligned obliquely to the course of the glass if any advantage is produced thereby in particular cases.

In Fig. 3 there is disclosed a different form of the invention, in which a frame 23, supplied with a cross bar 11, supports a vertically arranged motor 10 having a shaft which passes through the beam 11 and is connected to a gear 12. The gear 12 meshes with gears 13—13 which are mounted in bearings 14—14 by means of hollow shafts 13'—13' which are shown to be cast integrally with the gears. Shafts 15 pass through the gears 13—13 and are keyed thereto against relative rotary motion but longitudinal motion of the shafts 15 with respect to the gears 13 is not prevented. Thrust bearings 24, of ball or roller type, are mounted on the upper ends of the shafts 15 and thin, flexible shafts 16 project downwardly from the bottoms of the shafts 15 and terminate in enlarged cylindrical heads 17 which are received in bearings 18 in the upper part of the beam 19 of the working tool. On the flexible shafts 16 are two counterweights 20 which are aligned in accordance with the principles set forth in the discussion of Fig. 2. As the motor 10 drives the gears, the shafts 15 and 16 are rotated and the counterweights 20 impart to the beam 19 homocircular motion. The frame 23 carries, on extensions projecting above the bar 11, two cylinders 22, 22 within which are pistons 21 having rods which project, through stuffing boxes in the bottoms of the cylinders, into contact with the thrust bearings 24. By admitting gas pressure, such as compressed air or steam to the upper face of the pistons 21, pressure can be applied upon the beam 19 to the extent desired.

In an alternative method of construction, not illustrated, the shafts 16 are not flexible but are rigid and the cylinders 17 are eccentrically mounted on the bottom of the shafts with an eccentricity which may be equal to one-half the desired diameter of the homocircle.

It sometimes happens that a tiny irregularity in the surface of the working face of the tool begins the formation of a line which is somewhat differently worked than neighboring regions of the glass plate, but this slight defect is without inconvenience in most cases, for example, during the grinding portion of the surfacing operation and during the first part of polishing, because the plate of glass passes under a series of tools which compensate for and remove the defects before the plate is finished. On the other hand, if this slight defect occurs in the last operations, for instance, about or after the termination of the wet polishing, there may arise that the latter part of the polishing may not rub out the lines. When this condition arises the surface is perfectly polished but, has, nonetheless, a slightly combed appearance when viewed in a particular light. In order to prevent the formation of these lines, in cases where they are observed to arise, it is possible to impart to the surfacing tools, in addition to the homocircular movement, a slow alternating motion or reciprocating motion across the surface of the glass in a direction transverse to the movement of the sheet. This practice, however, has the disadvantage that it carries the buffing surface over the edge of the sheet of glass and introduces a different degree of wear in those surfaces which engage the edge of the glass and those which do not.

The following concepts are believed to be novel; a process for surfacing glass sheets in which there is applied to the surface of the glass an abrasive action by means of tools employing homocurvilinear motion, in a closed figure, preferably homocircular, at small amplitude of an order comprised between one millimeter and several centimeters; the said process in which at least one tool of which the active surface, in the direction of the displacement of the glass sheet, has a dimension constant from one lateral edge to the other of the sheet; a process in which the said very small amplitude is a function of the size of the abrasive, for example, with homocircular movement and for sand of the usual sizes, homocircles of from one to four centimeters diameter for the large size (½ mm.) sand, five to ten millimeters in diameter for the medium size sand (50 m$\mu$), and two to five millimeters for the fine (10–20 m$\mu$); a process in which the frequency is of an order comprised between one hundred to several thousand turns per minute and for example, in the case of homocircular movement and with the usual sizes of grinding composition, of about one or several hundreds of turns per minute for the large size grains, and may attain several thousand turns per minute for the finer grains; these ranges are preferred orders of magnitude but the limits stated are not equatorial.

The process also, when applied to polishing, as distinguished from grinding, involves the following concepts: the amplitude of the motion of the tool increases as the working advances and as the polishing nears its end; the amplitude of movement during the wet phase of the polishing is on the order of a millimeter, the amplitude of movement during the dry phase of polishing is on the order of a centimeter.

In an apparatus constructed in accordance with the principles of the invention, the tool is preferably very long and thin, rigid and light, extending transversely from one edge to the other of the sheet of glass and is covered on its working face with a layer of felt, rubber, or the like, beneath which the liquid containing the abrasive is led onto the surface of the glass, preferably by a large number of supply tubes which can penetrate the tool itself or which can be arranged beside the tool; the tool is given its small amplitude of movement by the reaction of counterweights eccentrically mounted with respect to the axis of rotation; the movement may be imparted to the tool by a motor which is mounted on the tool, or by a plurality of motors mounted on the tool, as illustrated in Fig. 2; the shafts of such motors carry eccentric counterweights; the tools may be given a circular movement of translation, or homocircular motion, by the action of eccentrics, driven from a motor not mounted on the tool, upon two separated points of the tool; the pressure upon the tool upon the glass may be controlled by springs or by pressure means; the tool may be disposed obliquely with respect to the line of motion of the plates of glass.

In addition to the homocurvilinear motion, the tool may be given a slow and sufficient reciprocating motion transversely of the glass.

As many apparently widely different embodiments of the present invention may be made without departing from the spirit and scope thereof, it is to be understood that the invention is not limited to the specific embodiments.

What is claimed is:

1. A method for polishing the surface of a sheet of glass that comprises producing relative movement between the glass and polishing means comprising at least one polishing member having a working surface of substantially constant width extending substantially completely across the surface to be polished and adapted to bear upon and polish the surface of said sheet, and polishing said sheet progressively by isotropic translatory motion of said means.

2. A method for polishing the surface of a sheet of glass that comprises producing relative, progressive movement between the glass and polishing means comprising at least one polishing member having a working surface of substantially constant width extending substantially completely across the surface to be polished and adapted to bear upon and polish the surface of said sheet, and polishing said sheet progressively by isotropic translatory motion of said means, the amplitude of the isotropic motion being between 1 mm. and several cm.

3. A method for polishing the surface of a sheet of glass that comprises producing relative movement between the glass and polishing means comprising at least one polishing member having a working surface of substantially constant width extending substantially completely across the surface to be polished and adapted to bear upon and polish the surface of said sheet, and polishing said sheet progressively by isotropic translatory motion of said means, the amplitude of the isotropic motion being between 1 mm. and several cm., and the velocity of the said motion being in the range between about a hundred and several thousand R. P. M.

4. A method for polishing the surface of a sheet of glass to which is imparted a continuous linear movement past members exerting a polishing action on the glass, that comprises polishing the surface of the sheet of glass with a plurality of working members having each an active surface of which the dimension in the direction of displacement of the sheet of glass is constant from one edge to the other of this sheet, these members being actuated with a periodic movement of translation which is exerted according to closed directing curves, in particular circular, and has an amplitude which is comprised between about one millimeter and several centimeters.

5. A method of polishing the surface of a sheet of glass, according to claim 4, in which there are stages of wet and dry polishing and the amplitude of the periodic translatory movement is, during the wet phase of the polishing operation, of the order of one millimeter and is, during the dry phase, of the order of a centimeter.

6. A method for polishing the surface of the sheet of glass to which is imparted continuous motion in a certain direction which comprises grinding the glass transversely to its direction of motion substantially throughout its width with a series of grinding compositions of decreasing grain size while imparting to each grain size isotropic translatory motion of decreasing magnitude, the magnitude whereof is related to the size of the grain, and polishing the glass sheet as it issues from the grinding by polishing means applied to the glass substantially throughout the width thereof, utilizing said motion, and increasing the amplitude of the isotropic, translatory motion as the polishing progresses.

7. A method for polishing the surface of a sheet of glass to which is imparted continuous motion in a certain direction which comprises grinding the glass transversely to its direction of motion substantially throughout its width with a series of grinding compositions of decreasing grain size while imparting to successive grain sizes isotropic, translatory motion of decreasing magnitude, the magnitude whereof is related to the size of the grain, imparting to such coarse abrasive a relatively slow rate of motion and to such finer abrasive a relatively rapid rate of motion, polishing the glass sheet as it issues from the grinding by polishing means applied to the glass substantially throughout the width thereof, utilizing isotropic, translatory motion, and increasing the amplitude of the isotropic, translatory motion as the polishing progresses so that the tool shall have an amplitude of movement sufficient to bear on several crests in the glass at one time.

8. A method for working the surface of a sheet of glass that comprises producing relative movement between the sheet and surface working means comprising at least one elongated surface working member having a working surface of substantially constant width adapted to bear upon the surface of said sheet, and working said sheet by isotropic translatory motion of said means, as said sheet and said means are displaced with respect to one another, said isotropic translatory motion having an amplitude between about 1 mm. and several cm. and a velocity between about 100 and several thousand R. P. M.

9. The method of claim 8 in which the said member extends from edge to edge of the sheet in a direction across the line of relative motion of the sheet and means.

10. A method for working the surface of a sheet of glass to which is imparted a continuous linear movement past a member exerting a surfacing action on the glass, that comprises working the surface of the sheet of glass progressively with at least one working member having an active surface of which the dimension in the direction of displacement of the sheet of glass is constant from one edge to the other of the sheet, this member being actuated with an isotropic periodic movement of translation which is executed according to closed curves, and has an amplitude comprised between about one millimeter and several centimeters and a frequency between about 100 and several thousand R. P. M.

11. A method for grinding the surface of a sheet of glass to which is imparted a continuous movement past grinding members exerting an abrasive action on the glass surface, that comprises grinding the surface of the glass sheet with successive grinding members having each an active surface of which the dimension in the direction of displacement of the sheet of glass is substantially constant from one edge to the other of the glass sheet, actuating these members with isotropic periodic movements of translation executed according to closed directing curves, feeding the first of said successive members with abrasive of one size, feeding the succeeding grinding member with abrasive of a smaller size, actuating the first of said successive members with a closed curve of an amplitude of one size, which is between about 1 mm. and several cm. in magnitude, and with a velocity between about 100 and several thousand R. P. M., and actuating the said succeeding member with a closed curve having lesser amplitude than said first member, and with a velocity between about 100 and several thousand R. P. M.

12. A method for grinding the surface of a glass sheet according to claim 11 in which the amplitude of the periodic translatory movement of several working members is comprised between 5 mm. and 2.5 mm. for medium particles of abrasive, and between 2.5 mm. and 1 mm. for the fine particles of abrasive sludges.

13. A method of grinding glass and the like which comprises grinding in one stage with abrasive particles of large size and in a later stage with abrasive particles of lesser size, grinding the glass with each said size of abrasive by isotropic, translatory motion applied to the abrasive in a band of substantially uniform width extending fully across one dimension of the glass, moving each said band progressively and in sequence along the surface of the glass to accomplish the grinding, and moving said abrasive of lesser size with isotropic translatory motion of less amplitude than that employed upon the abrasive of larger size, the amplitude of such motion being between 1 mm. and several cm. and the velocity of such motion being between about 100 and several thousand R. P. M.

14. The method of claim 13 in which the revolutions of the translatory motion per minute are increased as the amplitude thereof is decreased.

15. The method of claim 13 in which each said amplitude of translatory motion is a function of the size of abrasive particle worked on.

16. A method of grinding glass or the like that comprises moving the glass along a straight course, subjecting the glass to isotropic grinding at a plurality of stations along the course, performing the grinding at such stations by abrasive grains of decreasing size with periodic translatory motion, performing the said grinding on grains of greater size with periodic translatory motion of larger amplitude and on grains of lesser size with periodic translatory motion of lesser amplitude, and applying such grinding with each size of abrasive, in a band of uniform longitudinal extent, across the whole width of the moving glass at a velocity between a few hundred and several thousand R. P. M. and an amplitude between 1 mm. and several cm.

17. A method of working the surface of a moving sheet of glass that comprises grinding the surface successively with abrasive compositions containing grains of progressively decreasing size, the grains of one such composition being largely on the order of a half millimeter in size, the grains of a following composition yet later employed being largely on the order of 10–20 mu, and grinding the glass with the said compositions by tools actuated with isotropic homocircular motion having amplitude between 1 mm. and several centimeters and velocity between about a hundred and several thousand R. P. M.

18. A method of working the surface of a moving sheet of glass that comprises grinding the surface progressively and isotropically with abrasive compositions containing grains of progressively decreasing size, the grains of one such composition being largely on the order of a half millimeter in size, the grains of a following composition being largely on the order of 50 mu, and the grains of a composition yet later employed being largely on the order of 10–20 mu, grinding the glass with the composition containing the said half millimeter grains by a tool having a uniform width of working surface in the direction of motion of the glass and extending substantially across the glass actuated with a homocircular motion having a diameter circa 4–1 cm., grinding the glass with the composition containing the said 50 mu grains by a similar tool actuated with a homo-circular motion having a diameter on the order of 10–5 mm., grinding the glass with the composition containing the said 10–20 mu grains by a similar tool actuated with a homocircular motion having a diameter on the order of 5–2 mm., said tools being actuated with velocities in the range between 100 and several thousand R. P. M.

19. A method for polishing the surface of a sheet of glass to which is imparted a continuous linear movement past members exerting a polishing action on the glass, that comprises polishing the surface of the sheet of glass with at least one working member having an active surface of which the dimension in the direction of displacement of the sheet of glass is substantially constant from one edge to the other of the glass sheet, such member being actuated with a periodic movement of translation which is exerted according to closed directing curves, in particular circular, and has an amplitude which is comprised between about one millimeter and several centimeters.

20. A method for polishing the surface of a sheet of glass to which is imparted a continuous linear movement past members exerting a polishing action on the glass, that comprises polishing the surface of the sheet of glass with at least one working member having an active surface of which the dimension in the direction of displacement of the sheet of glass is substantially constant from one edge to the other of the glass sheet, such member being actuated with a periodic movement of translation which is exerted according to closed directing curves, in particular circular, and has an amplitude which is comprised between about one millimeter and several centimeters, and a velocity between one hundred and several thousand R. P. M.

References Cited in the file of this patent

UNITED STATES PATENTS

| | | |
|---|---|---|
| 336,582 | Morris | Feb. 23, 1886 |
| 513,618 | Oppermann | Jan. 30, 1894 |
| 741,001 | Brockett | Oct. 6, 1903 |
| 1,075,107 | Kann | Oct. 7, 1913 |
| 1,610,419 | Brown | Dec. 14, 1926 |
| 1,741,145 | Drennon | Dec. 31, 1929 |
| 1,962,766 | Crowley et al. | June 12, 1934 |
| 1,962,767 | Crowley et al. | June 12, 1934 |
| 2,070,944 | Hillix | Feb. 16, 1937 |
| 2,193,419 | George | Mar. 12, 1940 |
| 2,270,309 | Kehle | Jan. 20, 1942 |
| 2,367,668 | Champayne | Jan. 23, 1945 |
| 2,437,034 | Meinzer | Mar. 2, 1948 |